Jan. 25, 1927.
J. A. KAMBERLING
1,615,708
ROAD MAP CASE
Filed June 11, 1926
Fig.1.
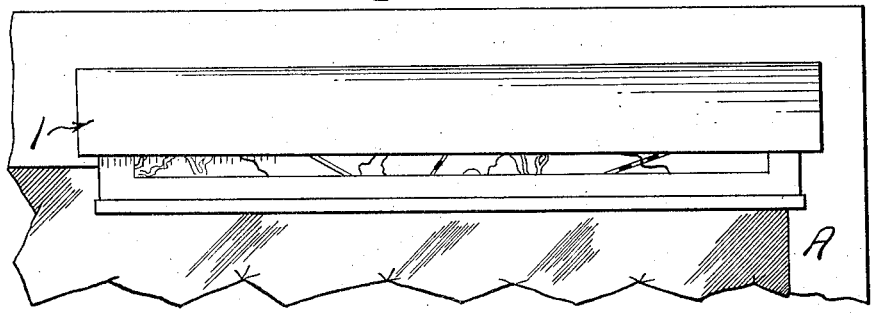
Fig.2.
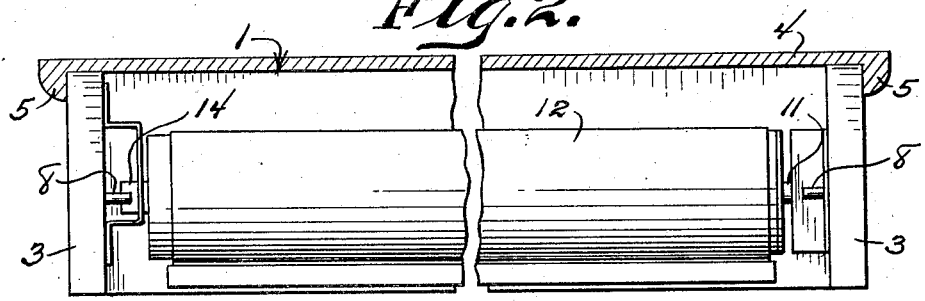
Fig.3.    Fig.6.    Fig.4.
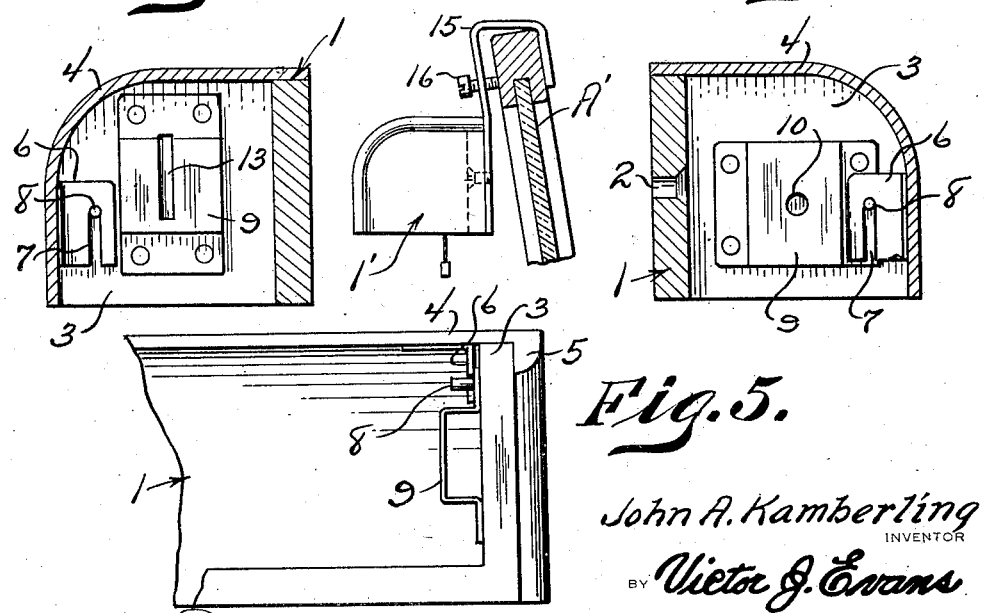
Fig.5.
John A. Kamberling
INVENTOR
BY Victor J. Evans
ATTORNEY
WITNESS:

Patented Jan. 25, 1927.

1,615,708

UNITED STATES PATENT OFFICE.

JOHN A. KAMBERLING, OF JENKINS, MINNESOTA.

ROAD-MAP CASE.

Application filed June 11, 1926. Serial No. 115,324.

An object of the invention is to provide means for holding road maps and the like adjacent the windshield of a motor vehicle or the like so that the driver or occupant of the vehicle can have ready access to a map of the country through which he is passing, with means for enclosing the map when the same is not in use.

A further object of the invention is to place a map on a spring roller, with a case for holding the roller and with means for fastening the case to a part of the vehicle.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a fragmentary view showing the device fastened to a part of the windshield of a motor vehicle.

Figure 2 is a sectional view.

Figure 3 is a transverse sectional view.

Figure 4 is a similar view, but looking toward the other end of the device.

Figure 5 is a view of one end of the case

Figure 6 is a view of a modification.

As shown in these views, the device comprises a case 1 which is adapted to be fastened to a part of the windshield A of a vehicle by screws or the like passing through the openings 2 in the back of the case. This case is formed with the end pieces 3 which have their upper outer corners cut away to form curves and a cover 4 of curved shape in cross section is adapted to fit over the case. Flanges 5 are formed on the ends of the cover to overlap the end pieces 3, the curved ends of the cover engaging the curved portions of the end pieces. The cover has a bracket 6 adjacent each end thereof which is of angle shape and has a slot 7 in its free flange for engaging a pin 8 on each end piece so that when the slotted brackets are pushed over the pins, the cover is fastened to the case. Each end piece is also provided with a plate 9 which has an offset central portion, one plate having a hole 10 therein to receive the pintle 11 of a spring roller 12, while the other offset portion is provided with a slot 13 to receive the square pintle 14 of the spring roller. Thus the spring roller is detachably mounted in the case and it cannot be removed until the cover 4 is removed from the case.

Figure 6 shows a modification for fastening the device to the windshield A' of an open car. In this case, hook-shaped brackets 15 are fastened to the rear of the case 1' and the hooked portions are placed over the windshield and fastened thereto by the set screws 16.

From the foregoing, it will be seen that with this device attached to the windshield and a road map fastened to the roller, the map can be readily lowered from out of the case so that the driver or other occupant of the vehicle can see the map. After the map has been used, it is returned to the case by permitting it to be rolled upon the spring roller.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:-

A device for supporting a map on a windshield of a vehicle comprising a casing having a back and ends, a cover having portions engaging the upper edges of the said back and ends, said cover having flanges at its ends overlapping the ends of the casing, a pair of brackets connected with the inner front face of the cover and each bracket having a vertical slot therein, pins on the ends of the casing which are engaged by the slots for removably holding the cover to the casing, brackets on the ends of the casing and a spring roller upon which a map is wound having its pintles engaging said brackets.

In testimony whereof I affix my signature.

JOHN A. KAMBERLING.